United States Patent
Smith et al.

(10) Patent No.: US 8,956,539 B2
(45) Date of Patent: Feb. 17, 2015

(54) SYSTEM AND METHOD FOR DRYING BIOSOLIDS AND ENHANCING THE VALUE OF DRIED BIOSOLIDS

(71) Applicant: I. Kruger Inc., Cary, NC (US)

(72) Inventors: Travis Smith, Raleigh, NC (US); J. Jason Boyd, Cary, NC (US)

(73) Assignee: I. Kruger Inc., Cary, NC (US)

(*) Notice: Subject to any disclaimer, the term of this patent is extended or adjusted under 35 U.S.C. 154(b) by 124 days.

(21) Appl. No.: 13/791,928

(22) Filed: Mar. 9, 2013

(65) Prior Publication Data

US 2014/0250962 A1    Sep. 11, 2014

(51) Int. Cl.
   *C02F 3/00*    (2006.01)
   *C05F 7/00*    (2006.01)

(52) U.S. Cl.
   CPC ..................................... *C05F 7/00* (2013.01)
   USPC ..................... 210/607; 210/609; 210/631

(58) Field of Classification Search
   USPC ............................ 210/607, 609, 631
   See application file for complete search history.

(56) References Cited

U.S. PATENT DOCUMENTS

| | | | |
|---|---|---|---|
| 5,309,849 A * | 5/1994 | Krebs | 110/224 |
| 5,775,004 A * | 7/1998 | Steier et al. | 34/424 |
| 2013/0074357 A1* | 3/2013 | Wagner et al. | 34/282 |
| 2014/0223979 A1* | 8/2014 | Wiseman et al. | 71/13 |

* cited by examiner

*Primary Examiner* — Chester Barry
(74) *Attorney, Agent, or Firm* — Coats and Bennett PLLC

(57) ABSTRACT

A system and process for drying biosolids and wherein nutrients and/or minerals are blended into partially dried biosolids. Further, the system and method compresses the mixture of biosolids and nutrients into a selected form and this is followed by completion of the drying process. In the end, a more uniform and higher value dried biosolids product is produced.

18 Claims, 4 Drawing Sheets

SYSTEM AND METHOD FOR DRYING BIOSOLIDS AND ENHANCING THE VALUE OF DRIED BIOSOLIDS

FIELD OF THE INVENTION

The present invention relates to wastewater treatment and more particularly to a system and process for drying biosolids, blending nutrients and minerals with partially dried biosolids and pelletizing partially dried biosolids.

BACKGROUND OF THE INVENTION

Biosolids from wastewater treatment operations are dried and processed into fertilizer and sold to farmers and others for land application. One of the major drawbacks to the conventional processing of biosolids is that the final biosolids product is generic and is not particularly designed to meet the needs of certain farmers or to meet the enrichment needs of soils in a particular geographical location.

Furthermore, many biosolids products do not lend themselves to spreadability. Spreadability is a function of particle size, shape and density. The success of a dried biosolids product depends to a significant extent on the ability of the biosolids product to be efficiently packaged and easily applied to the land. Also size, shape and density of the biosolids product factor into various end applications such as nurseries, turf grass, tree farms and other agricultural application where the size of the biosolids product impacts the applications.

Therefore, there has been and continues to be a need for a dried biosolids product that is custom blended with nutrients and/or minerals to meet the particular needs of soils in a certain geographical region. Further, there is a need for a biosolids processing system that forms the biosolids into relatively dense particles of a size and shape that enable the biosolids particles to be easily spread.

SUMMARY OF THE INVENTION

The present invention relates to a system and process that custom blends nutrients and/or minerals into partially dried biosolids that is particularly suited for certain soils. In one embodiment, biosolids are directed into a dryer and during a first drying phase, the biosolids are partially dried. After the biosolids have been partially dried, they are subjected to a blending operation where nutrients and/or minerals are blended with the partially dried biosolids. After the nutrients and/or minerals have been blended into the partially dried biosolids, the biosolids are subjected to a second drying phase where the biosolids are further dried to a point where they can be appropriately packaged.

The present invention also includes a system and process for pelletizing and increasing the bulk density of the biosolids. In one embodiment illustrated herein, the pelletizing process is integrated into the biosolids drying process. After the biosolids have been partially dried in the dryer, the biosolids are directed through a pelletizing machine or a device that forms the biosolids into pellets or relatively small solids. The pelletizing machine compresses the biosolids, thereby reducing the amount of air in the biosolids and increasing the bulk density of the biosolids. In the pelletizing process, the pelletizing machine forms the biosolids into particles of a particular size and shape that enable the dried biosolids particles to be efficiently applied in land application.

Other objects and advantages of the present invention will become apparent and obvious from a study of the following description and the accompanying drawings which are merely illustrative of such invention.

DESCRIPTION OF EXEMPLARY EMBODIMENTS

Figure 1:
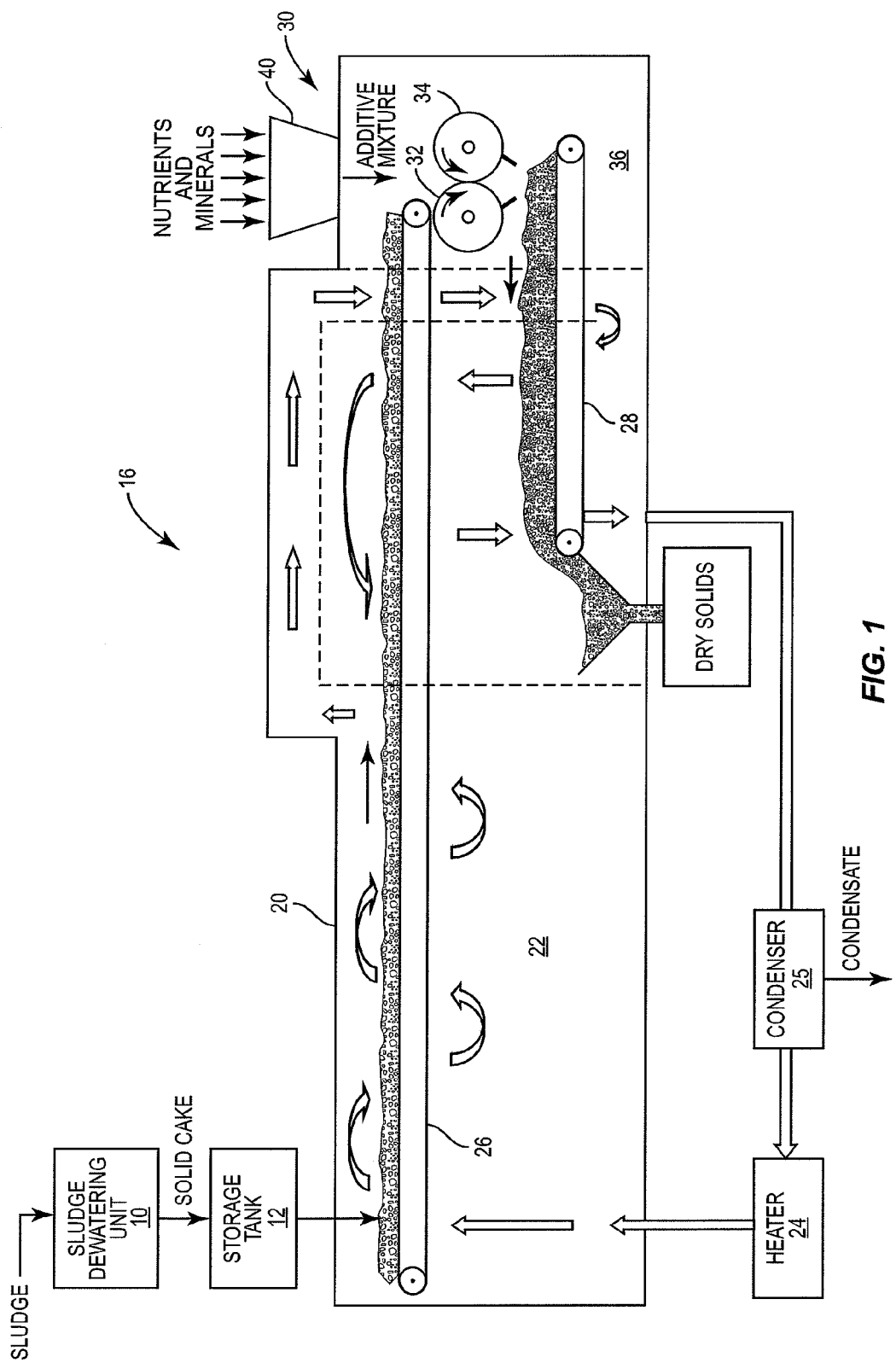
FIG. 1 is a schematic illustration of a biosolids dryer illustrating a process for drying biosolids, blending nutrients and minerals into the biosolids and forming the biosolids into relatively small solids or pellets.

With further reference to the drawings, the present invention relates to a method or process for treating biosolids produced from wastewater treatment processes. Biosolids may be produced in conventional municipal wastewater treatment processes, industrial wastewater treatment processes or concentrated animal feeding operations. Generally, biosolids are separated from the wastewater being treated and various types of sludge or biosolids pre-treatment processes can be employed. In the case of the present invention, in one embodiment, it is common to dewater the sludge or biosolids (see FIG. 1) and after the dewatering process, the biosolids are treated in accordance with the present invention. Generally, the biosolids, after dewatering and prior to drying in accordance with the present invention, have a dry solids content of approximately 15% to approximately 30% by weight. Herein all references to dry solids content is made with respect to percentage weight.

The present invention entails a biosolids phase drying process where the biosolids are subjected to different drying phases. The biosolids are first partially dried in a first phase in a dryer. During the first phase of drying, the biosolids will be subjected to a temperature as high as 350° F. The process aims to dry the biosolids in the first phase to where the dry solids content of the biosolids is approximately 50% to approximately 65%. This will dry the biosolids to a point where they are just past a "sticky" phase.

After partially drying the biosolids and completing the first phase of drying, the biosolids are subjected to various treatments. In one embodiment, the partially dried biosolids undergo a blending operation where nutrients and minerals are blended into the partially dried biosolids. Various nutrients and minerals can be blended. For example, phosphorus, pot ash, nitrate, ammonia, or other enhancing substances and materials can be added. As used herein, the term "nutrients" is used to encompass nutrients, minerals and other enhancing substances or materials. In practice, the blend incorporated into the partially dried biosolids can constitute a custom blend particularly suited for soils in a particular geographical location or can be custom blended to the order of a farmer or a group of farmers.

In another embodiment, after the biosolids have been partially dried in the first drying phase, the biosolids can be subjected to a pelletizing process. Here the method or process of the present invention, in this embodiment, pelletizes the biosolids into uniform shapes and sizes. This facilitates the packaging and handling of the biosolids and also makes the biosolids much easier to spread and apply to soils. In addition, the pelletizing compresses air from the biosolids and is effective to increase the bulk density of the biosolids.

In one embodiment, the process of the present invention, after partially drying the biosolids, includes both blending nutrients into the biosolids and pelletizing the biosolids. Subsequent portions of this disclosure will discuss such in more detail.

In any event, after blending nutrients into the biosolids and/or pelletizing the biosolids, the biosolids is subjected to a second drying phase. Generally, the second drying phase is conducted at a temperature less than the temperature utilized in the first drying phase. In the second drying phase, the treated and processed biosolids are dried such that their dry solids content is greater than approximately 90%. Thereafter, the dried biosolids are packaged, transported and ultimately applied in land applications.

Biosolids which are dried and processed according to the present invention are produced in the course of treating wastewater. In one example, a wastewater stream is biologically treated and in the course of biological treatment, produces activated sludge which includes biosolids. The activated sludge, along with biosolids, is separated from treated or a clarified effluent with some of the biosolids recycled to the main stream of the process and some of the biosolids are wasted. The wasted biosolids can be further treated. As shown in FIG. 1, these biosolids are eventually directed to a dewatering unit 10 that dewaters sludge, including biosolids, to form cake. The cake is typically stored in a storage tank 12. A pump (not shown) is utilized to pump the dewatered biosolids to a biosolids dryer and processor indicated generally by the numeral 16. In one embodiment, the present invention focuses on the biosolids dryer and processor 16. As discussed above, the function of the biosolids dryer and processor 16 is to dry the biosolids and to process the biosolids by blending nutrients with the biosolids and/or pelletizing the biosolids.

Figure 4:
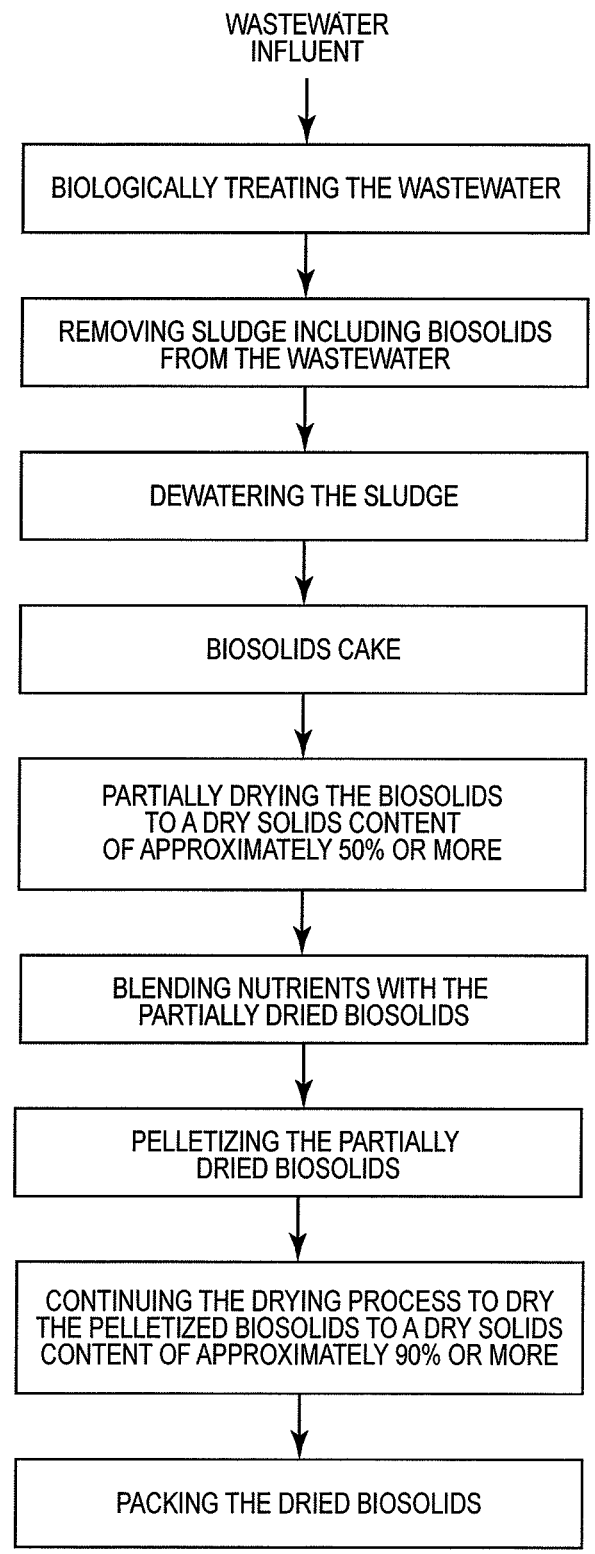
FIG. 4 is a block diagram showing the basic processes that occur in one embodiment of the present invention.

FIG. 4 is a block diagram that depicts the basic processes that take place in one embodiment of the present invention. As noted above, in one embodiment, a wastewater influent is biologically treated. In the course of treating the wastewater, sludge including biosolids is removed. Thereafter, the sludge is treated and one process that is often employed in treating sludge is dewatering the sludge. This process produces a biosolids cake which is then partially dried in a dryer to a dry solids content of approximately 50% or more. See FIG. 4. Thereafter, nutrients are blended with the partially dried biosolids and/or the partially dried biosolids are pelletized. Thereafter, the process continues by drying the partially dried biosolids that have blended nutrients or which are pelletized to a dry solids content of approximately 90% or more. Then the process entails packaging the dried biosolids or transporting them from the drying and processing site. It should be noted that the latter steps of the process depicted in FIG. 4 can be performed at the site of a wastewater treatment facility or sludge including biosolids can be partially processed and transferred to another site for further treatment.

Turning to FIG. 1, a biosolids dryer and processor 16 is shown therein. This apparatus or system functions to dry the biosolids, blend nutrients into the biosolids and pelletize the biosolids. In this particular case, the equipment utilized to blend nutrients and pelletize the biosolids is incorporated into the dryer itself. The dryer includes a housing 20 and a drying chamber 22 therein. A heat source 24 is utilized to generate heat, which is transferred to the drying chamber via a conventional air handling system. The dryer would include a conventional temperature control systems for controlling the temperature within the drying chamber 22 and, in some cases, the drying chamber is effectively divided into temperature zones such that one portion or one area of a drying chamber is maintained at a different temperature than another area of the drying chamber. As seen in FIG. 1, the air handling system directs heated air into the drying chamber 22. Return air is directed from the drying chamber 22 through a condenser 25 that produces a condensate. The air handling system then directs the return air from the condenser 25 to the heat source 24.

In the embodiment illustrated in FIG. 1, the dryer is provided with a first powered conveyor 26. The design of the conveyor can vary, but in one embodiment, the first conveyor 26 includes an endless belt or apron that is perforated to allow drying air to pass therethrough. First conveyor 26 includes an inlet end for receiving biosolids to be dried and a discharge end for discharging partially dried biosolids. The system and process is designed such that the first conveyor 26 only partially dries the biosolids. As explained before, the biosolids delivered to the dryer would typically have a dry solids content of approximately 15% to 30%. Generally, the system and process contemplated by one embodiment is that the biosolids discharged by the first conveyor 26 would have a dry solids content of approximately 50% to approximately 65%.

The biosolids dryer and processor 16 further includes a second conveyor 28 that is separate from the first conveyor 26. It also includes an inlet end and a discharge end and is powered. In one embodiment, the first and second conveyors 26 and 28 can be generally disposed in different temperature zones within the drying chamber 26. It may be difficult to precisely maintain a certain temperature in one zone and another temperature in another zone, but generally the temperature within the drying chamber can be controlled and varied such that biosolids transported on the first conveyor 26 are exposed to higher temperatures than the biosolids transported on the second conveyor 28.

The system disclosed in FIG. 1 includes a combination blending and pelletizing subsystem indicated generally by the numeral 30. As seen in FIG. 1, subsystem 30 is integrated into the dryer itself. Forming a part of the combination blending and pelletizing system 30 is a pair of powered counter-rotating rollers 32 and 34. Rollers 32 and 34 are typically powered by a variable speed electric motor which enables the rotation speed of the rollers to be varied and controlled. Rollers 32 and 34 are spaced apart so as to define a nip between the rollers. When pelletizing is desired, the rollers 32 and 34 about their respective surfaces are provided with relief areas or pellet-forming recesses 38. See FIG. 2. That is, as biosolids are delivered to the top surfaces of the rollers 32 and 34, the biosolids are moved to and through the nip and as the biosolids pass through the nip, the relief areas or pellet-forming recesses 34 effectively form the biosolids into uniform size and shaped pellets which are discharged from the underside of the rollers 32 and 34. In some cases, the rollers 32 and 34 may be provided about the lower sides with wipers or blades that scrape or remove the pelletized biosolids from the rollers. The size and shape of the pellets formed by rollers 32 and 34 can be varied. This can be accomplished in a number of ways. First, the subsystem 30 could be provided with different sets of rollers where each set of rollers is designed with recesses 38 to produce a certain size or shape biosolids pellet. Alternatively, the rollers 32 and 34 could be provided with various outer sleeves that can be easily removed or installed on the rollers 32 and 34 and with the various sleeves having different size and shape pellet recesses formed therein.

Figure 2:
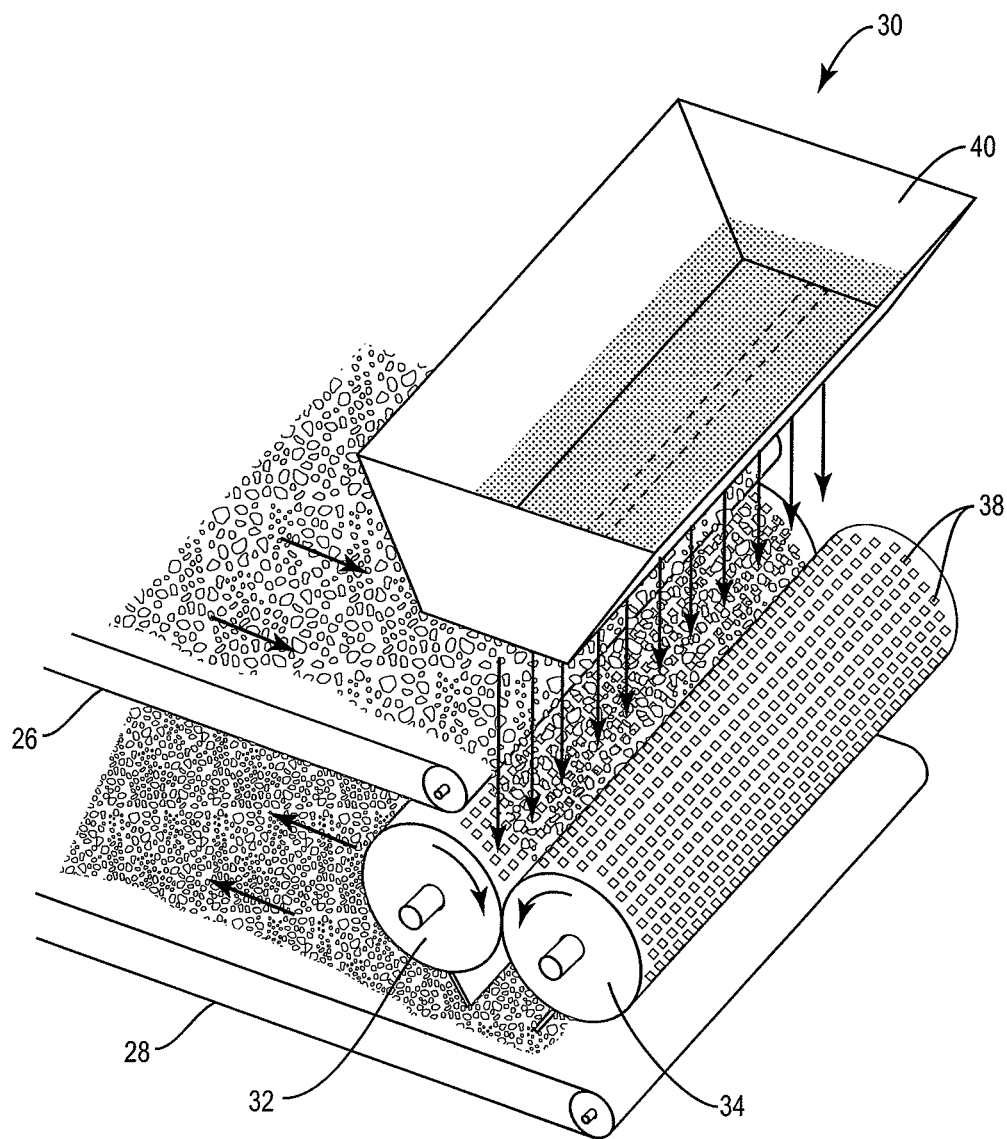
FIG. 2 is a fragmentary perspective view illustrating the system of FIG. 1 which blends nutrients and minerals with the biosolids and pelletizes the biosolids.

As seen in FIG. 2, the dryer includes a compartment 36 that is adjacent the drying chamber 22 which is designed to receive and hold the rollers 32 and 34. Compartment 36 is generally insulated from the drying chamber 22.

A nutrient hopper 40 is aligned with the rollers 32 and 34. Incorporated into the lower portion of the hopper 40 is a metering dispenser (not shown). Metering dispenser functions to automatically control the disbursement of nutrients from the hopper 40. It is appreciated by those skilled in the art that the metering dispenser could be of a rotary metering device and automatically controlled to dispense nutrients as a function of the quantity of biosolids delivered to the underlying rollers 32 and 34. Various types of control systems can be incorporated to control the dispensing of nutrients from the hopper 40.

In operation, biosolids delivered to the first conveyor 26 move along with the first conveyor from the inlet end to the discharge end and, in the process, are partially dried as discussed above. Biosolids are discharged from the first conveyor 26 to the rollers 32 and 34. The discharge end of the first conveyor 26 can be positioned such that the biosolids fall onto the rollers 32 and 34. In one embodiment, nutrient hopper 40 can discharge nutrients directly onto the biosolids on the discharge end of the first conveyor 26. There may be intermediate conveyors or other types of material handling equipment between the conveyors 26 and 28 and the blending and pelletizing equipment, and in those cases, biosolids are not directly transferred from the first conveyor 26 to the rollers 32 and 34. In any event, in one embodiment, the system and process is designed such that nutrients from the hopper 40 are mixed with the biosolids and the mixture of biosolids and nutrients are blended together by the rollers 32 and 34. Rollers 32 and 34, as already described, function to pelletize the biosolids. Pelletized biosolids exiting the rollers 32 and 34 are directed onto the second conveyor 28 to finalize drying. In some cases, the pelletized biosolids can be conveyed directly from the rollers 32 and 34 onto the lower or second conveyor 28. In other cases, there is provided intermediate conveyors or material handling equipment for transferring the pelletized biosolids to the second conveyor 28. In any event, once the pelletized biosolids are transferred to the second conveyor 28, the biosolids flow right-to-left as viewed in FIG. 1 towards the discharge end of the second conveyor. By the time the pelletized biosolids reach the discharge end of the second conveyor, they are substantially dry; that is, they have a dry solids content greater than approximately 90%. Now the pelletized biosolids that have been enhanced with nutrients can be bagged or packaged for transport and sale.

Figure 3:
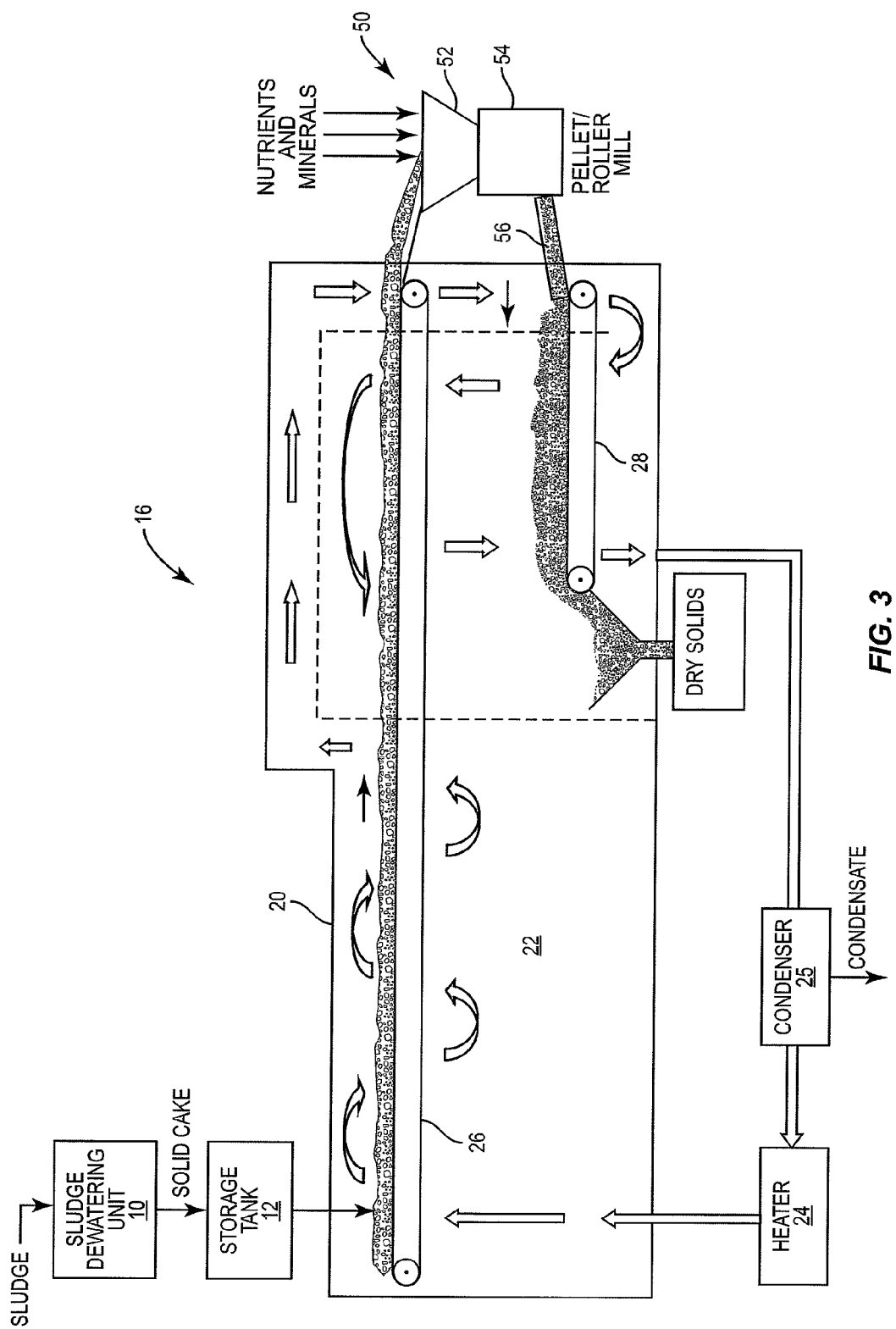
FIG. 3 is a schematic illustration of an alternative system and process for blending nutrients and minerals into the biosolids and pelletizing the biosolids.

Turning to the FIG. 3 embodiment, this system and process includes a combination blending and pelletizing machine indicated generally by the numeral 50. It is positioned adjacent the end of the dryer and includes an upper hopper 52 for receiving nutrients from a nutrient source and biosolids from the first conveyor 26. Biosolids conveyed into the upper hopper 52 are mixed and blended with the nutrients. Disposed below the upper hopper is a pelletizing mill 54. Partially dried biosolids blended with the nutrients is dispersed downwardly into the pelletizing mill 54 which can be adjusted to vary the size or shape of the pellets that are formed thereby. In one embodiment, an oscillating conveyor, such as a screw conveyor 56, extends from the outlet of the combination blending and pelletizing machine 50 and is inoperative to transfer biosolids pellets from machine 50 to the second conveyor 28. Because, in many applications, the first and second conveyors are relatively wide and the blending and pelletizing machine 50 is typically not as wide, it may be appropriate to provide an oscillating discharge conveyor for evenly distributing the pelletized biosolids onto the second conveyor 28. As with the embodiment described above and shown in FIGS. 1 and 2, the system and process discussed with respect to the FIG. 3 embodiment, may incorporate intermediate conveyors or material handling equipment to handle the transfer of biosolids from the first conveyor 26 to the blending and pelletizing machine 50 and from the blending and pelletizing machine to the second conveyor 28.

There are many advantages to the system and process discussed above. By enhancing the biosolids with nutrients and pelletizing the biosolids, the value of the biosolids is substantially enhanced. Furthermore, the system and process of the present invention enables the biosolids to be custom blended with nutrients that are particularly suited for land and soil in various geographical locations. In some instances, the biosolids can even be custom blended for a particular farmer. Finally, the pelletizing process discussed herein is effective to remove air from the biosolids and increase the bulk density of the biosolids.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of treating biosolids produced by a biological wastewater treatment process comprising:
   a. providing biosolids produced in a biological wastewater treatment process where the biosolids have a dry solids content of 30% or less;
   b. directing the biosolids to a dryer having first and second separate conveyors;
   c. placing the biosolids on the first conveyor and subjecting the biosolids to a first drying phase by partially drying the biosolids during the first phase to where the dry solids content of the biosolids is approximately 50% or more;
   d. after the first drying phase, directing the biosolids to a blender and blending nutrients into the partially dried biosolids; and
   e. after the first drying phase and after blending nutrients into the biosolids, placing the biosolids onto the second conveyor and drying the biosolids in a second drying phase in the dryer to where the dry solids content of the biosolids is greater than 90%.

2. The method of claim 1 including positioning the biosolids on a first conveyor in the dryer; moving the biosolids through the dryer on the first conveyor and partially drying the biosolids in the process; discharging the biosolids from the first conveyor; after the biosolids have been partially dried, directing the biosolids into a blender and blending the nutrients with the biosolids and pelletizing the biosolids; and directing the pelletized biosolids onto a second conveyor; moving the pelletized biosolids through the dryer on the second conveyor and further drying the pelletized biosolids such that the pelletized biosolids include a dry solids content greater than 90%.

3. The method of claim 1 including moving the biosolids through the dryer, and wherein as the biosolids move through the dryer, the biosolids are subjected to a decreasing temperature.

4. The method of claim 1 wherein the nutrients blended into the biosolids comprise a custom blend dictated, in part at least, by soil conditions in a particular geographical area.

5. The method of claim 1 wherein the temperature in the dryer varies from about 350° F. to about 220° F.

6. The method of claim 1 comprising increasing the bulk density of the biosolids by removing air from the biosolids.

7. The method of claim 1 including pelletizing the biosolids during drying and after the moisture content of the biosolids has been reduced to where the biosolids have a dry solids content of 50% or more.

8. The method of claim 1 including pelletizing the biosolids after partially drying the biosolids.

9. The method of claim 1 wherein pelletizing the biosolids includes crushing, sizing and separating the biosolids into pellets.

10. The method of claim 2 wherein at least a portion of the blending and pelletizing of the biosolids occurs outside of the dryer.

11. The method of claim 1 including, after blending nutrients with the biosolids, compressing the biosolids to increase the density of the biosolids and pelletizing the biosolids.

12. A method of treating biosolids produced by a biological wastewater treatment process comprising:
   a. providing biosolids produced in a biological wastewater treatment process where the biosolids have a dry solids content of 30% or less;
   b. directing the biosolids to a dryer having first and second separate conveyors;
   c. placing the biosolids on the first conveyor and subiectinq the biosolids to a first drying phase by partially drying the biosolids during the first phase to where the dry solids content of the biosolids is at least 50%;
   d. after the first drying phase, directing the biosolids to a pelletizer and pelletizing the biosolids; and
   e. after the first drying phase and after pelletizing the biosolids, placing the biosolids onto the second conveyor and drying the biosolids in a second drying phase in the dryer to where the dry solids content of the pelletized biosolids is greater than 90%.

13. The method of claim 12 wherein prior to pelletizing the biosolids and after the first drying phase, directing the biosolids to a blender and blending nutrients with the partially dried biosolids.

14. The method of claim 12 including pelletizing the biosolids by directing the biosolids onto two counter-rotating rollers and directing the biosolids downwardly through a nip defined between the two rollers that compress the biosolids, and removing the biosolids in the form of pellets from the two counter-rotating rollers.

15. The method of claim 12 wherein pelletizing the biosolids includes directing the biosolids through a nip defined between two counter-rotating rollers where each roller includes a surface having relief spots formed therein.

16. The method of claim 12 wherein there is disposed two counter-rotating rollers between the first and second conveyors where the rollers include relief areas formed on surfaces of the rollers and wherein the method includes directing biosolids from the first conveyor onto the rollers which effectively compress and pelletize the biosolids after which the biosolids are placed on the second conveyor which moves the pelletized biosolids through the dryer.

17. The method of claim 12 further including:
loading a hopper that is at least partially disposed outside the dryer with nutrients;
distributing the nutrients from the hopper to two counter-rotating rollers;
directing the partially dried biosolids onto the two counter-rotating rollers and utilizing the rollers to blend the nutrients into the biosolids; and
directing the biosolids downwardly through a nip between the two rollers such that the biosolids exiting the rollers include blended nutrients.

18. The method of claim 17 wherein surfaces of the two counter-rotating rollers include relief areas that pelletize the biosolids as the biosolids pass through the nip of the rollers.

* * * * *